(12) United States Patent
Kim

(10) Patent No.: US 10,479,372 B2
(45) Date of Patent: Nov. 19, 2019

(54) VEHICLE CONTROL APPARATUS AND CONTROL METHOD THEREOF

(71) Applicant: MANDO CORPORATION, Pyeongtaek-si, Gyeonggi-do (KR)

(72) Inventor: Kwang-Hui Kim, Yongin-si (KR)

(73) Assignee: MANDO CORPORATION, Pyeongtaek-si, Gyeonggi-do (KR)

( * ) Notice: Subject to any disclaimer, the term of this patent is extended or adjusted under 35 U.S.C. 154(b) by 169 days.

(21) Appl. No.: 15/825,392

(22) Filed: Nov. 29, 2017

(65) Prior Publication Data

US 2018/0148067 A1    May 31, 2018

(30) Foreign Application Priority Data

Nov. 29, 2016 (KR) .................. 10-2016-0160002

(51) Int. Cl.
*B60W 40/109* (2012.01)
*B60W 30/02* (2012.01)

(52) U.S. Cl.
CPC .......... *B60W 40/109* (2013.01); *B60W 30/02* (2013.01); *B60W 2520/06* (2013.01); *B60W 2520/12* (2013.01); *B60W 2520/14* (2013.01)

(58) Field of Classification Search
CPC ............... B60W 40/109; B60W 30/02; B60W 2520/14; B60W 2520/06; B60W 2520/12
See application file for complete search history.

(56) References Cited

U.S. PATENT DOCUMENTS 7,366,598 B2 * 4/2008 Ono ................. B60T 8/172
                                                 701/30.2
8,880,293 B2 * 11/2014 Hirao ............... B60W 10/22
                                                 701/38

(Continued)

FOREIGN PATENT DOCUMENTS

KR   1020050077322 A   8/2005
KR   1020080023838 A   3/2008

OTHER PUBLICATIONS

Korean Office Action dated Feb. 13, 2018, issued in corresponding Korean Patent Application No. 10-2016-0160002, citing the above references.

*Primary Examiner* — Russell Frejd
(74) *Attorney, Agent, or Firm* — Hauptman Ham, LLP

(57) ABSTRACT

Disclosed herein are a vehicle control apparatus and a control method thereof. The vehicle control apparatus includes an input unit configured to receive a current yaw rate value, a current steering angle value, and a current lateral acceleration value detected by a detection device, an estimator configured to obtain an estimated lateral acceleration value of lateral acceleration estimation model information on the basis of the received current yaw rate value and current steering angle value, a determiner configured to determine that the current lateral acceleration value is abnormal when the received current lateral acceleration value is not equal to the estimated lateral acceleration value of the lateral acceleration estimation model information, and a controller configured to receive the current yaw rate value, the current steering angle value, and the current lateral acceleration value, deliver an estimation command to the estimator, and deliver a determination command to the determiner.

18 Claims, 19 Drawing Sheets

(56) References Cited

U.S. PATENT DOCUMENTS

2005/0090943 A1\* 4/2005 Kogure .............. B60G 17/0195
 701/1
2010/0211261 A1\* 8/2010 Sasaki ................. B60G 17/016
 701/37

\* cited by examiner

VEHICLE CONTROL APPARATUS AND CONTROL METHOD THEREOF

CROSS-REFERENCE TO RELATED APPLICATION

This application claims the benefit of Korean Patent Application No. 10-2016-0160002, filed on Nov. 29, 2016 in the Korean Intellectual Property Office, the disclosure of which is incorporated herein by reference.

BACKGROUND

1. Field

Embodiments of the present disclosure relate to a vehicle control apparatus and a control method thereof.

2. Description of the Related Art

Generally, conventional electronic stability control (ESC) apparatuses have controlled an orientation of a vehicle to prevent reduction in vehicle driving stability.

In this case, conventional ESC apparatuses have determined whether to execute control by determining vehicular movement on the basis of a driver's steering input by means of a lateral acceleration sensor, which is a detection apparatus for detecting a lateral acceleration value.

As an example, Korean Patent No. 10-1627649, which was published on May 31, 2016, discloses a vehicle control apparatus capable of enhancing stability of an ESC apparatus by determining whether the ESC apparatus will execute control by means of an inertial sensor including a lateral acceleration sensor and a control method thereof.

However, when a conventional inertial sensor, including a lateral acceleration sensor, outputs an abnormal value due to an external or internal environment, vehicular movement changes in a direction a driver does not want due to a change in a control execution state of an ESC apparatus.

Accordingly, a conventional ESC apparatus using a lateral acceleration sensor has limitations in preventing a malfunction in advance and thus limitations in enhancing vehicular stability.

Thus, research has recently been conducted on an improved vehicle control apparatus capable of enhancing vehicular stability by preventing a malfunction of an ESC apparatus in advance and a control method thereof.

SUMMARY

Therefore, it is an aspect of the present disclosure to provide a vehicle control apparatus capable of preventing malfunction of an ESC apparatus and enhancing vehicular stability and a control method thereof.

It is another aspect of the present disclosure to provide a vehicle control apparatus capable of further enhancing efficiency in controlling a vehicular orientation and a control method thereof.

It is still another aspect of the present disclosure to provide a vehicle control apparatus capable of reducing anxiety about a current operating state while providing guidance for careful driving to a driver and a control method thereof.

Additional aspects of the disclosure will be set forth in part in the description which follows and, in part, will be obvious from the description, or may be learned by practice of the disclosure.

In accordance with one aspect of the present disclosure, a vehicle control apparatus includes an input unit configured to receive a current yaw rate value, a current steering angle value, and a current lateral acceleration value detected by a detection device; an estimator configured to obtain an estimated lateral acceleration value of lateral acceleration estimation model information on the basis of the received current yaw rate value and current steering angle value; a determiner configured to determine that the current lateral acceleration value is abnormal when the received current lateral acceleration value is not equal to the estimated lateral acceleration value of the lateral acceleration estimation model information; and a controller configured to receive the current yaw rate value, the current steering angle value, and the current lateral acceleration value, deliver an estimation command to the estimator, and deliver a determination command to the determiner.

The lateral acceleration estimation model information may include first lateral acceleration estimation model information for calculating a first estimated lateral acceleration value by using the current yaw rate value and a current vehicle speed value.

The lateral acceleration estimation model information may include second lateral acceleration estimation model information for calculating a second estimated lateral acceleration value by using the current steering angle value, a current vehicle speed value, a distance value between a front wheel and a rear wheel, and a vehicular characteristic speed value.

The input unit may further receive first difference values between current lateral acceleration values corresponding to current vehicle speeds further detected by the detection device over a certain time period and first estimated lateral acceleration values, and the determiner may further determine whether the current lateral acceleration values are in a first state in which the received first difference values are greater than a predetermined first reference value and may output a first determination signal when the current lateral acceleration values are in the first state.

The input unit may further receive second difference values between current lateral acceleration values corresponding to current vehicle speeds further detected by the detection device over a certain time period and second estimated lateral acceleration values, and the determiner may further determine whether the current lateral acceleration values are in a second state in which the received second difference values are greater than a predetermined second reference value and may output a second determination signal when the current lateral acceleration values are in the second state.

The input unit may further receive current steering angle values corresponding to current vehicle speeds further detected by the detection device over a certain time period, and the determiner may change determination times of the second determination signal corresponding to levels of the second difference values according to the current steering angle values corresponding to the current vehicle speeds while outputting the second determination signal.

The determiner may output the second determination signal at a first determination time among the determination times of the second determination signal corresponding to levels of the second difference values when the received current steering angle values corresponding to the current vehicle speeds are within a steering angle value range corresponding to a predetermined low vehicle speed value range, may output the second determination signal at a second determination time set longer than the first determination time among the determination times of the second determination signal corresponding to levels of the second difference values when the received current steering angle values corresponding to the current vehicle speeds are within a steering angle value range corresponding to a predetermined medium vehicle speed value range, and may output the second determination signal at a third determination time set longer than the second determination time among the determination times of the second determination signal corresponding to levels of the second difference values when the received current steering angle values corresponding to the current vehicle speeds are within a steering angle value range corresponding to a predetermined high vehicle speed value range.

The input unit may further receive third difference values between first estimated lateral acceleration values and second estimated lateral acceleration values corresponding to current vehicle speeds further detected by the detection device over a certain time period, and the determiner may further determine whether the current lateral acceleration values are in a third state in which the received third difference values are smaller than a predetermined third reference value and may output a third determination signal when the current lateral acceleration values are in the third state.

The controller may ignore delivery of an operating command to an electronic stability control (ESC) apparatus when the current lateral acceleration value is abnormal.

The vehicle control apparatus may further include a compensator configured to compensate for the current lateral acceleration value so that the ESC apparatus is operated according to a predetermined target lateral acceleration value range when the current lateral acceleration value is abnormal.

In accordance with another aspect of the present disclosure, a vehicle control method includes receiving a current yaw rate value, a current steering angle value, and a current lateral acceleration value detected by a detection device; obtaining an estimated lateral acceleration value of lateral acceleration estimation model information on the basis of the received current yaw rate value and current steering angle value; and determining that the current lateral acceleration value is abnormal when the received current lateral acceleration value is not equal to the estimated lateral acceleration value of the lateral acceleration estimation model information.

The vehicle control method may further include receiving first difference values between current lateral acceleration values corresponding to current vehicle speeds further detected by the detection device over a certain time period and first estimated lateral acceleration values; and determining whether the current lateral acceleration values are in a first state in which the received first difference values are greater than a predetermined first reference value and outputting a first determination signal when the current lateral acceleration values are in the first state.

The vehicle control method may further include receiving second difference values between current lateral acceleration values corresponding to current vehicle speeds further detected by the detection device over a certain time period and second estimated lateral acceleration values; and determining whether the current lateral acceleration values are in a second state in which the received second difference values are greater than a predetermined second reference value and outputting a second determination signal when the current lateral acceleration values are in the second state.

The vehicle control method may further include receiving current steering angle values corresponding to current vehicle speeds further detected by the detection device over a certain time period; and changing determination times of the second determination signal corresponding to levels of the second difference values according to the current steering angle values corresponding to the current vehicle speeds while outputting the second determination signal.

The vehicle control method may further include outputting the second determination signal at a first determination time among the determination times of the second determination signal corresponding to the levels of the second difference values when the received current steering angle values corresponding to the current vehicle speeds are within a steering angle value range corresponding to a predetermined low vehicle speed value range; outputting the second determination signal at a second determination time set longer than the first determination time among the determination times of the second determination signal corresponding to the levels of the second difference values when the received current steering angle values corresponding to the current vehicle speeds are within a steering angle value range corresponding to a predetermined medium vehicle speed value range; and outputting the second determination signal at a third determination time set longer than the second determination time among the determination times of the second determination signal corresponding to the levels of the second difference values when the received current steering angle values corresponding to the current vehicle speeds are within a steering angle value range corresponding to a predetermined high vehicle speed value range.

The vehicle control method may further include receiving third difference values between first estimated lateral acceleration values and second estimated lateral acceleration values corresponding to current vehicle speeds further detected by the detection device over a certain time period; and determining whether the current lateral acceleration values are in a third state in which the received third difference values are smaller than a predetermined third reference value and outputting a third determination signal when the current lateral acceleration values are in the third state.

The vehicle control method may further include ignoring delivery of an operating command to an electronic stability control (ESC) apparatus when the current lateral acceleration value is abnormal.

The vehicle control method may further include compensating for the current lateral acceleration value so that the ESC apparatus is operated according to a predetermined target lateral acceleration value range when the current lateral acceleration value is abnormal.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
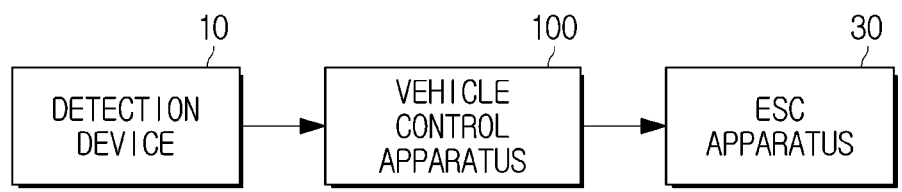
FIG. 1 is a block diagram showing a vehicle control apparatus connected to a detection device and an ESC apparatus according to an embodiment of the present disclosure.

Hereinafter, embodiments of the present disclosure will be described in detail with reference to the accompanying drawings. The following embodiments are provided to fully convey the spirit of the disclosure to those skilled in the art. The present disclosure may, however, be embodied in different forms and should not be construed as limited to the embodiments set forth herein. In the drawings, some elements that need not be used to describe the present disclosure will be omitted for clarity, and some elements may be exaggerated to facilitate an understanding of the present disclosure.

Figure 2:
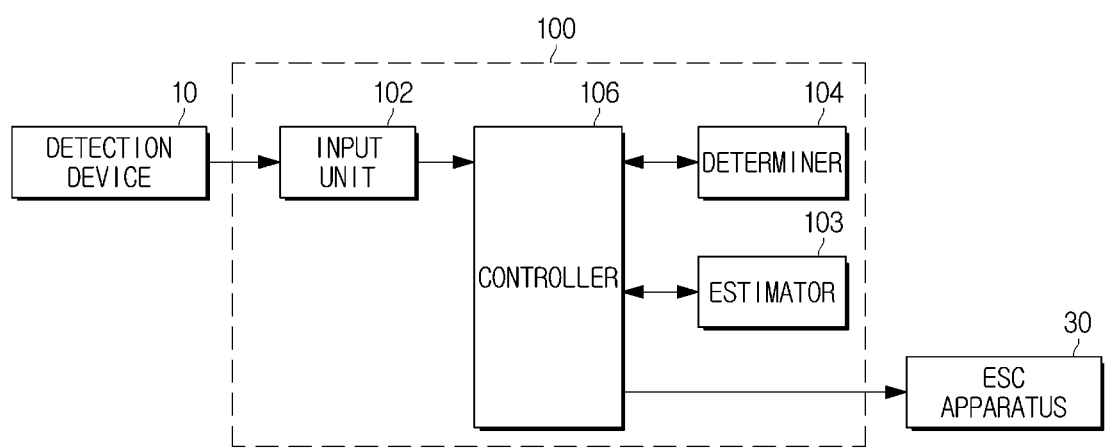
FIG. 2 is a block diagram showing an example of the vehicle control apparatus shown in FIG. 1.

FIG. 1 is a block diagram showing a vehicle control apparatus connected to a detection device and an ESC apparatus according to an embodiment of the present disclosure, and FIG. 2 is a block diagram showing an example of the vehicle control apparatus shown in FIG. 1.

Figure 3:
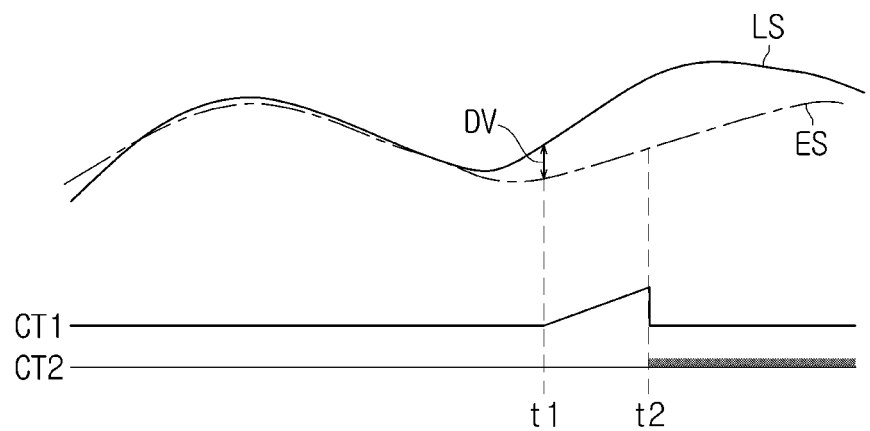
FIG. 3 illustrates waveforms showing a process in which a determiner shown in FIG. 2 outputs a first counting signal and a second counting signal.
Figure 4:
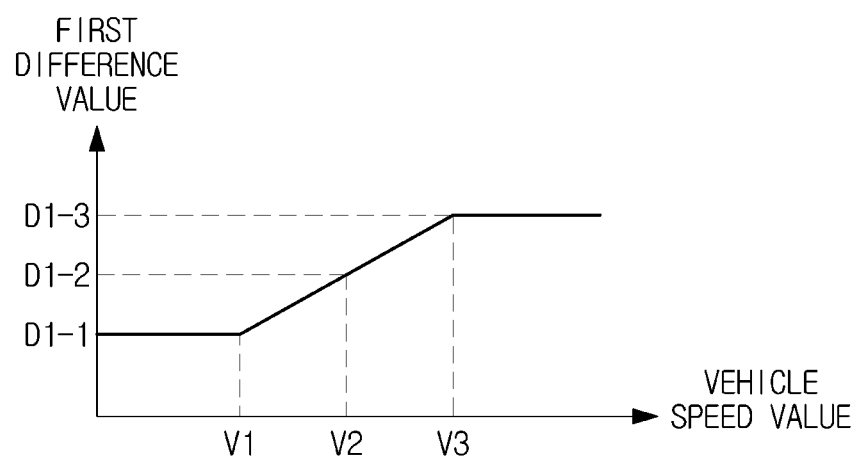
FIG. 4 is a graph showing a process in which the determiner shown in FIG. 2 determines whether a first difference value is greater than a predetermined first reference value and outputs a first determination signal.

FIG. 3 illustrates waveforms showing a process in which a determiner shown in FIG. 2 outputs a first counting signal and a second counting signal, and FIG. 4 is a graph showing a process in which the determiner shown in FIG. 2 determines whether a first difference value is greater than a predetermined first reference value and outputs a first determination signal.

Figure 5:
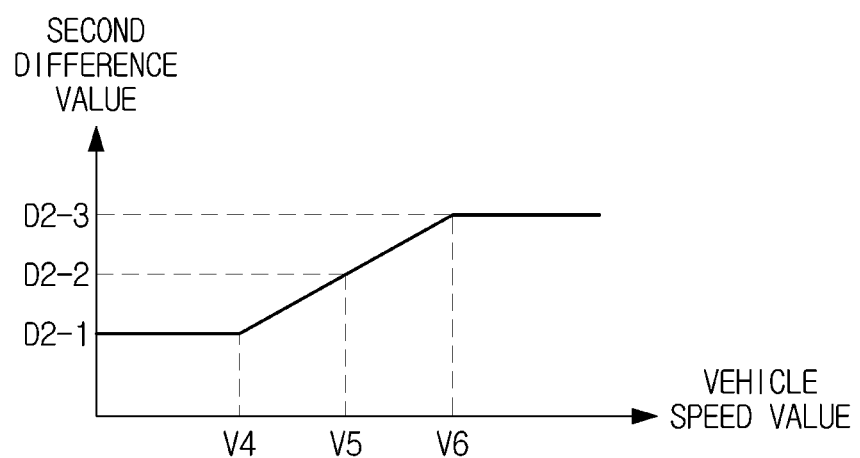
FIG. 5 is a graph showing a process in which the determiner shown in FIG. 2 determines whether a second difference value is greater than a predetermined second reference value and outputs a second determination signal.
Figure 6:
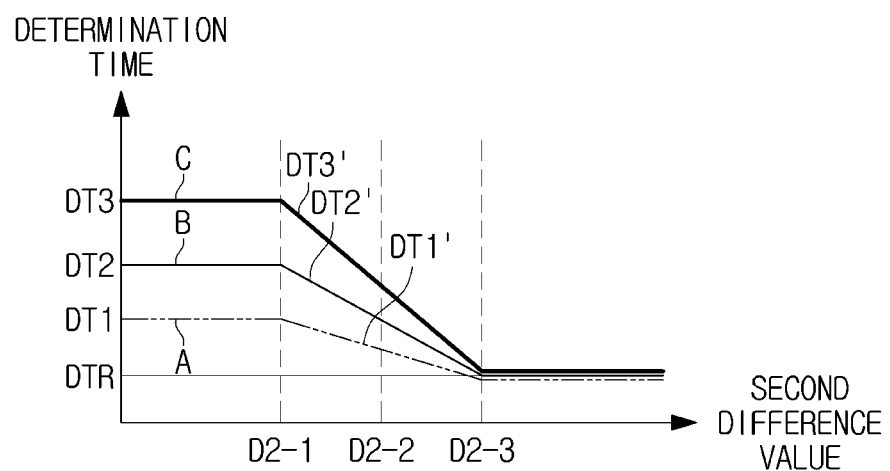
FIG. 6 is a graph showing a process in which the determiner shown in FIG. 2 outputs a second determination signal while changing a determination time of the second determination signal for each level of a second difference value according to a current steering angle value for each current vehicle speed.

FIG. 5 is a graph showing a process in which the determiner shown in FIG. 2 determines whether a second difference value is greater than a predetermined second reference value and outputs a second determination signal, and FIG. 6 is a graph showing a process in which the determiner shown in FIG. 2 outputs a second determination signal while changing a determination time of the second determination signal for each level of a second difference value according to a current steering angle value for each current vehicle speed.

Figure 7:
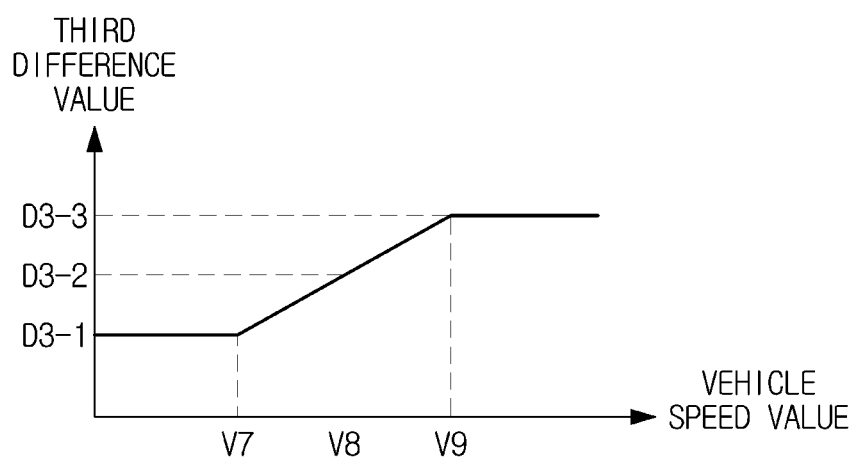
FIG. 7 is a graph showing a process in which the determiner shown in FIG. 2 determines whether a third difference value is smaller than a predetermined third reference value and outputs a third determination signal.

FIG. 7 is a graph showing a process in which the determiner shown in FIG. 2 determines whether a third difference value is smaller than a predetermined third reference value and outputs a third determination signal.

Referring to FIGS. 1 to 7, a vehicle control apparatus 100 according to an embodiment of the present disclosure includes an input unit 102, an estimator 103, a determiner 104, and a controller 106.

The input unit 102 receives a current yaw rate value, a current steering angle value, and a current lateral acceleration value detected by a detection device 10.

In this case, although not shown, the detection device 10 may include a yaw rate sensor (not shown) for detecting a current yaw rate value, a steering angle sensor (not shown) for a current steering angle value, and a lateral acceleration sensor (not shown) for detecting a current lateral acceleration value.

The estimator 103 obtains an estimated lateral acceleration value of lateral acceleration estimation model information Model 1 and Model 2 under the control of the controller 106, which will be described later, on the basis of the current yaw rate value and the current steering angle value received by the input unit 102.

Here, the lateral acceleration estimation model information Model 1 and Model 2 may include first lateral acceleration model information Model 1 and second lateral acceleration model information Model 2.

The first lateral acceleration estimation model information Model 1 may calculate a first estimated lateral acceleration value by using a current yaw rate value and a current vehicle speed value.

As an example, the first lateral acceleration estimation model information Model 1 may be represented as follows:

$$A_{y\_m} = \varphi \cdot V_{ref} \qquad \text{<Equation 1>}$$

where $A_{y\_m}$ may be a calculated first estimated lateral acceleration value, $\varphi$ may be a yaw rate value, and $V_{ref}$ may be a vehicle speed value.

The second lateral acceleration estimation model information Model 2 may calculate a second estimated lateral acceleration value by using a current steering angle value, a current vehicle speed value, a distance value between a front wheel and a rear wheel, and a vehicular characteristic speed value.

$$A_{y\_m} = \frac{V_{ref}^2}{L} \cdot \frac{\delta}{\left(1 + \frac{V_{ref}^2}{V_{ch}^2}\right)} \quad \langle\text{Equation 2}\rangle$$

where $A_{y\_m}$ may be a calculated second estimated lateral acceleration value, $\delta$ may be a steering angle value, $V_{ref}$ may be a vehicle speed value, L may be a distance value between a front wheel and a rear wheel, and $V_{ch}$ may be a vehicular characteristic speed value.

When the determiner 104 determines that the current lateral acceleration value received by the input unit 102 is not equal to the estimated lateral acceleration value of the lateral acceleration estimation model information Model 1 and Model 2 estimated by the estimator 103, the determiner 104 determines that the current lateral acceleration value is abnormal.

As an example, as shown in FIGS. 2 and 3, the determiner 104 may determine whether a difference value DV between a received current lateral acceleration value LS and an estimated lateral acceleration value ES of the lateral acceleration estimation model information Model 1 and Model 2 estimated by the estimator 103 is within a predetermined reference difference value range.

In this case, as shown in FIGS. 2 and 3, when it is determined that the difference value DV is within the predetermined reference difference value range, the determiner 104 may output a first counting signal CT1 that counts the difference value DV over a certain time period (between t1 to t2). When it is determined that the difference value DB is outside the predetermined reference difference value range, the determiner 104 may output a second counting signal CT2 that does not count the difference value DV after a certain time period (after t2)

Also, as shown in FIGS. 2 and 4, the input unit 102 of the vehicle control apparatus 100 according to an embodiment of the present disclosure may further receive first difference values D1-1, D1-2, and D1-3 between current lateral acceleration values corresponding to current vehicle speeds V1, V2, and V3 further detected by the detection device 10 over a certain time period and first estimated lateral acceleration values thereof.

Here, the first difference values D1-1, D1-2, and D1-3 increase as the current vehicle speeds V1, V2, and V3 transition from a low speed to a high speed.

In this case, in order to accurately determine a state of the current lateral acceleration values, the determiner 104 may further determine whether the state is a first state in which the received first difference values D1-1, D1-2, and D1-3 are greater than a predetermined first reference value and may output a first determination signal when the state is the first state.

Also, as shown in FIGS. 2 and 5, the input unit 102 of the vehicle control apparatus 100 according to an embodiment of the present disclosure may further receive second difference values D2-1, D2-2, and D2-3 between current lateral acceleration values corresponding to current vehicle speeds V4, V5, and V6 further detected by the detection device 10 over a certain time period and second estimated lateral acceleration values thereof.

Here, the second difference values D2-1, D2-2, and D2-3 increase as the current vehicle speeds V4, V5, and V6 transition from a low speed to a high speed.

In this case, in order to accurately determine a state of the current lateral acceleration values, the determiner 104 may further determine whether the state is a second state in which the received second difference values D2-1, D2-2, and D2-3 are greater than a second reference value. When the state is the second state, the determiner 104 may output a second determination signal.

Also, as shown in FIGS. 2 and 6, the input unit 102 of the vehicle control apparatus 100 according to an embodiment of the present disclosure may further receive current steering angle values A, B, and C for current vehicle speeds that are further detected by the detection device 10 over a certain time period.

In this case, when outputting the second determination signal, the determiner 104 may change determination times DT1, DT2, and DT3 of the second determination signal for levels of the second difference values D2-1, D2-2, and D2-3 according to the current steering angle values A, B, and C corresponding to the received current vehicle speeds.

As an example, when it is determined that the current steering angle value A corresponding to the received current vehicle speed is within a steering angle value range corresponding to a predetermined low vehicle speed value range, the determiner 104 may output the second determination signal at a first determination time DT1' among the determination times DT1, DT2, and DT3 of the second determination signal corresponding to the levels of the second difference values D2-1, D2-2, and D2-3.

Also, when it is determined that the current steering angle value B corresponding to the received current vehicle speed is within the steering angle value range corresponding to a predetermined medium vehicle speed value range, the determiner 104 may output the second determination signal at a second determination time DT2' that is set longer than the first determination time DT1' among the determination times DT1, DT2, and DT3 of the second determination signal corresponding to the levels of the second difference values D2-1, D2-2, and D2-3.

Also, when it is determined that the current steering angle value C corresponding to the received current vehicle speed is within the steering angle value range corresponding to a predetermined high vehicle speed value range, the determiner 104 may output the second determination signal at a third determination time DT3' that is set longer than the second determination time DT2' among the determination times DT1, DT2, and DT3 of the second determination signal corresponding to the levels of the second difference values D2-1, D2-2, and D2-3.

In this case, when it is determined that the current steering angle value corresponding to the current vehicle speed is not received by the input unit 102, the determiner 104 may output the second determination signal at a certain determination time DTR of the second determination signal that is set shorter than the first determination time DT1'.

Also, as shown in FIGS. 2 and 7, the input unit 102 of the vehicle control apparatus 100 according to an embodiment of the present disclosure may further receive third difference values D3-1, D3-2, and D3-3 between first estimated lateral acceleration values and second estimated lateral acceleration values corresponding to current vehicle speeds V7, V8, and V9 that are further detected by the detection device 10 over a certain time period.

Here, the third difference values D3-1, D3-2, and D3-3 increase as the current vehicle speeds V7, V8, and V9 transition from a low speed to a high speed.

In this case, in order to accurately determine a state of the current lateral acceleration values by increasing reliability of the first estimated lateral acceleration values and the second estimated lateral acceleration values, the determiner 104 may further determine whether the state is a third state in which the received third difference values D3-1, D3-2, and D3-3 are smaller than a third reference value. When the state is the third state, the determiner 104 may output a third determination signal.

The controller 106 receives the current yaw rate value, the current steering angle value, and the current lateral acceleration value, delivers an estimation command to the estimator 103, and delivers a determination command to the determiner 104.

In this case, when the current lateral acceleration value is abnormal, the controller 106 may not deliver an operating command to an electronic stability control (ESC) apparatus 30.

For the vehicle control apparatus 100 according to an embodiment of the present disclosure, the input unit 102, the determiner 104, the controller 106, an input unit 502, a determiner 504, and a controller 506 have been described as separate elements in order to clearly illustrate the features of the present disclosure. However, although not shown, the input unit 102, the estimator 103, the determiner 104, and the controller 106 may be a typical electric control unit (ECU) or micro control unit (MCU) for controlling the entire operation, performing input and determination functions, and estimating a lateral acceleration value.

Also, the input unit 102, the estimator 103, the determiner 104, and the controller 106 are not limited thereto. Any control means for controlling the entire vehicular operation, any input means for performing an input function, any determination means for performing a determination function, and any estimation means for estimating a lateral acceleration value may be used, respectively, as the controller 106, the input unit 102, the determiner 104, and the estimator 103.

Here, the input unit 102, the estimator 103, the determiner 104, and the controller 106 may be provided in the ECU (not shown) or the MCU (not shown) integrally or separately.

A vehicle control method for controlling a vehicle by means of the vehicle control apparatus 100 according to an embodiment of the present disclosure will be described with reference to FIGS. 8 to 12.

Figure 8:
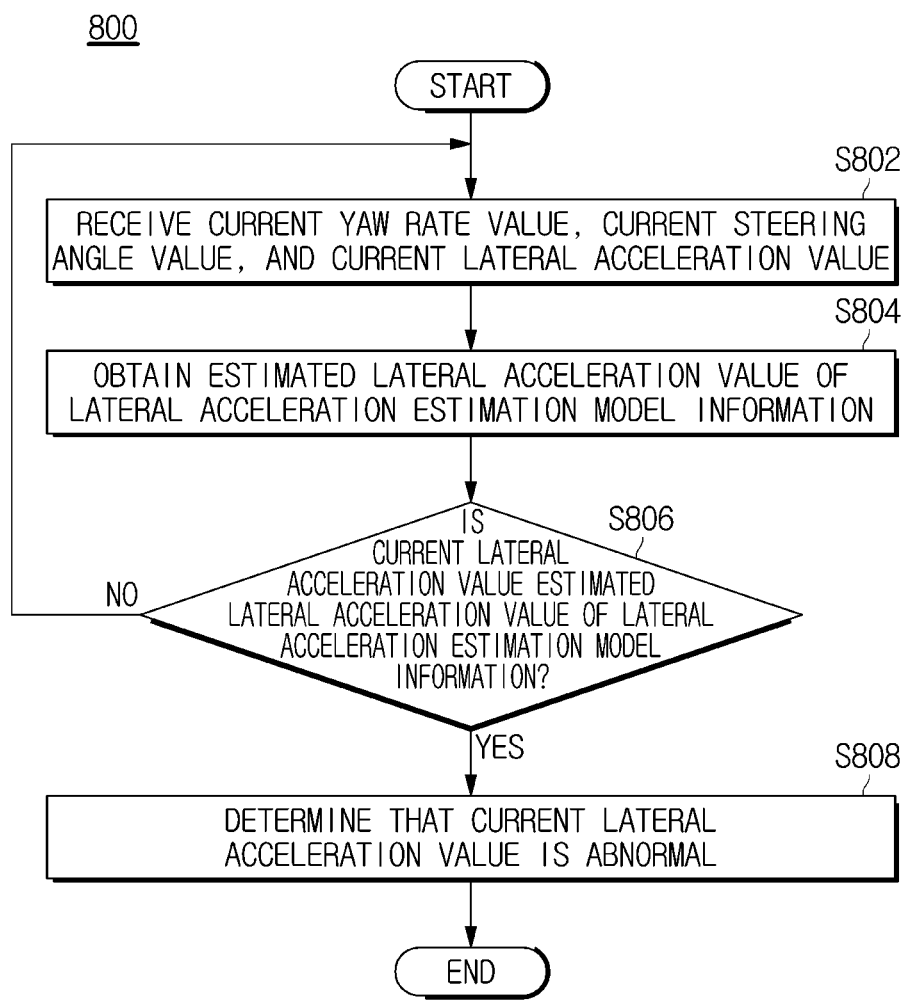
FIG. 8 is a flowchart illustrating an example of a vehicle control method of the vehicle control apparatus according to an embodiment of the present disclosure.
Figure 9:
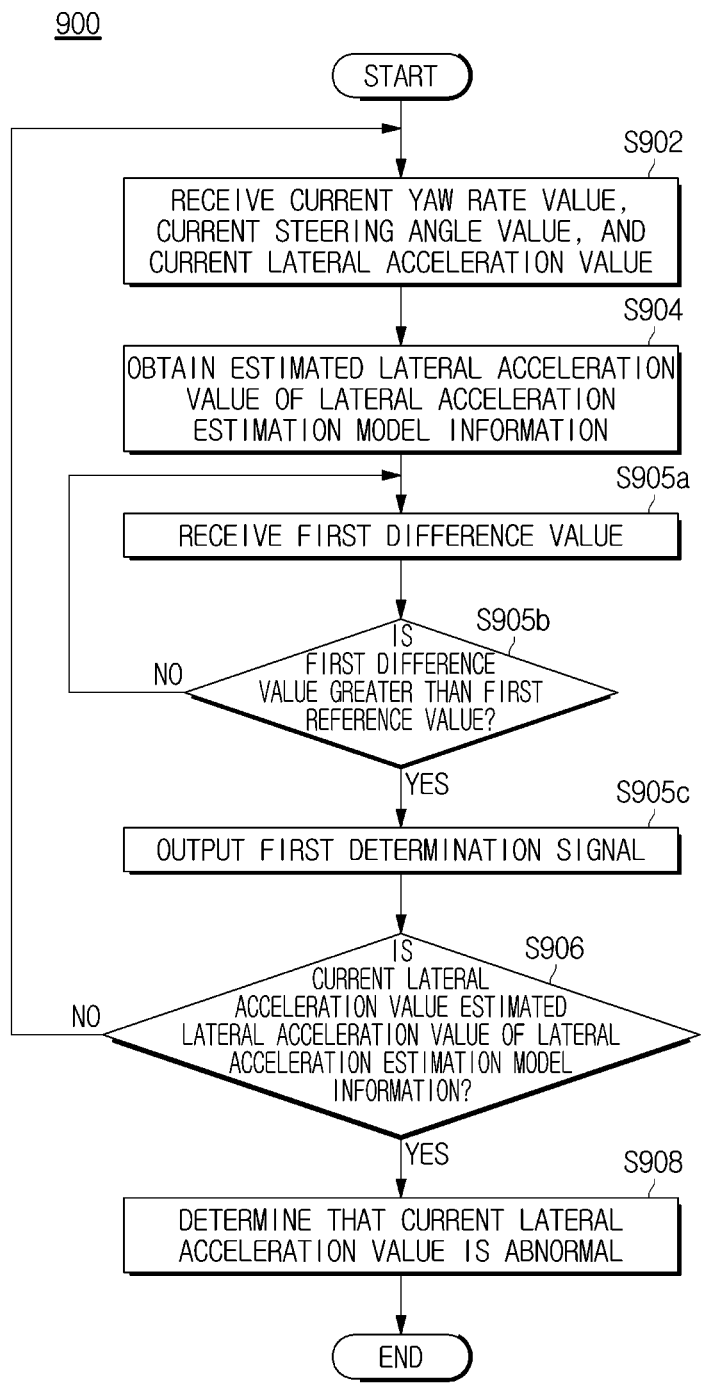
FIG. 9 is a flowchart illustrating another example of the vehicle control method of the vehicle control apparatus according to an embodiment of the present disclosure.

FIG. 8 is a flowchart illustrating an example of the vehicle control method of the vehicle control apparatus according to an embodiment of the present disclosure, and FIG. 9 is a flowchart illustrating another example of the vehicle control method of the vehicle control apparatus according to an embodiment of the present disclosure.

Figure 10:
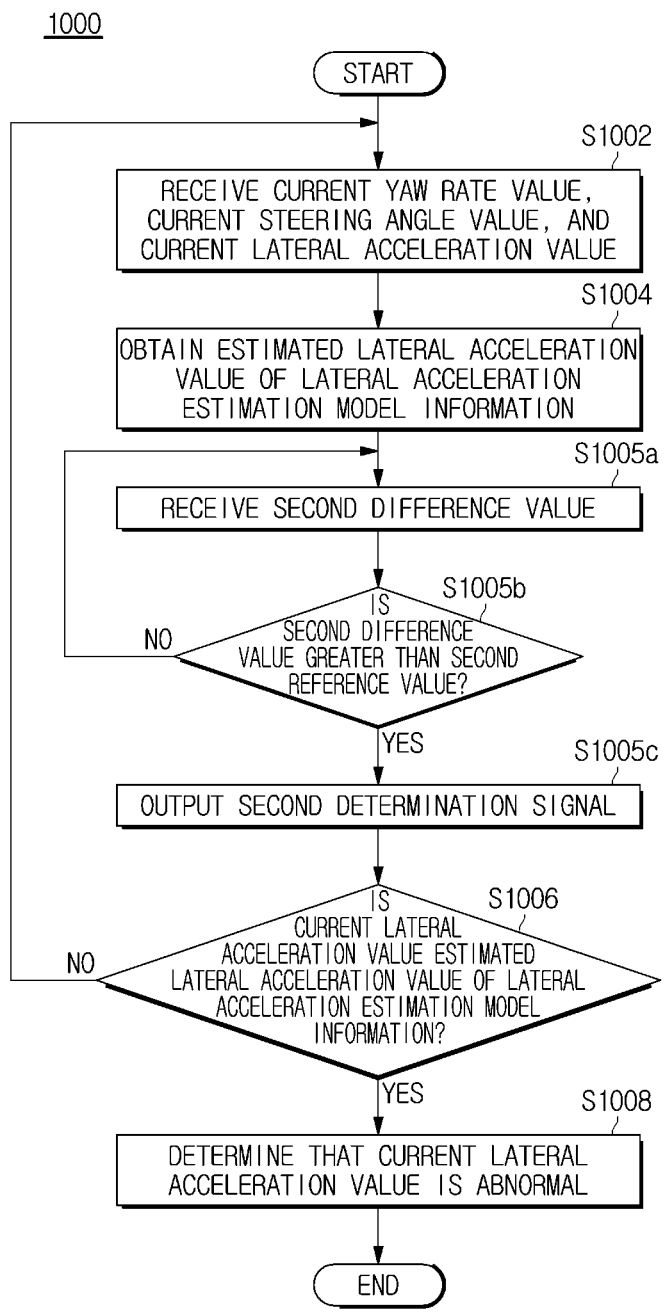
FIG. 10 is a flowchart illustrating still another example of the vehicle control method of the vehicle control apparatus according to an embodiment of the present disclosure.
Figure 11:
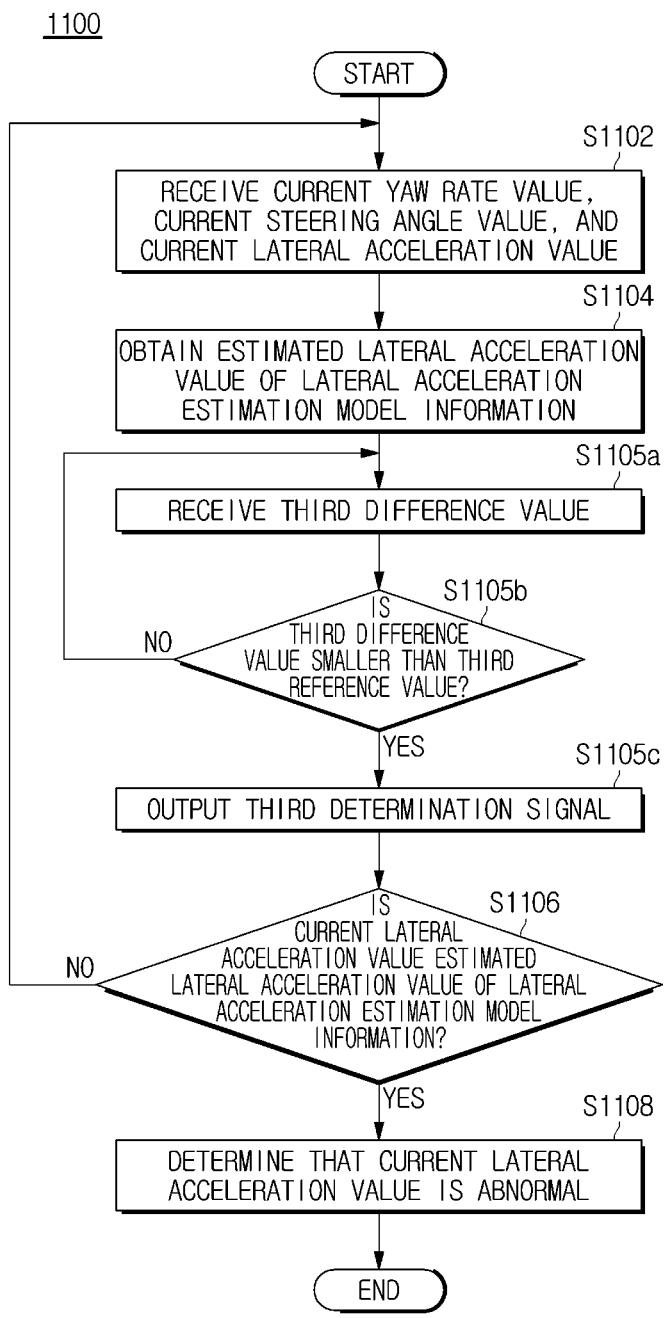
FIG. 11 is a flowchart illustrating still another example of the vehicle control method of the vehicle control apparatus according to an embodiment of the present disclosure.

FIG. 10 is a flowchart illustrating still another example of the vehicle control method of the vehicle control apparatus according to an embodiment of the present disclosure, and FIG. 11 is a flowchart illustrating still another example of the vehicle control method of the vehicle control apparatus according to an embodiment of the present disclosure.

Figure 12:
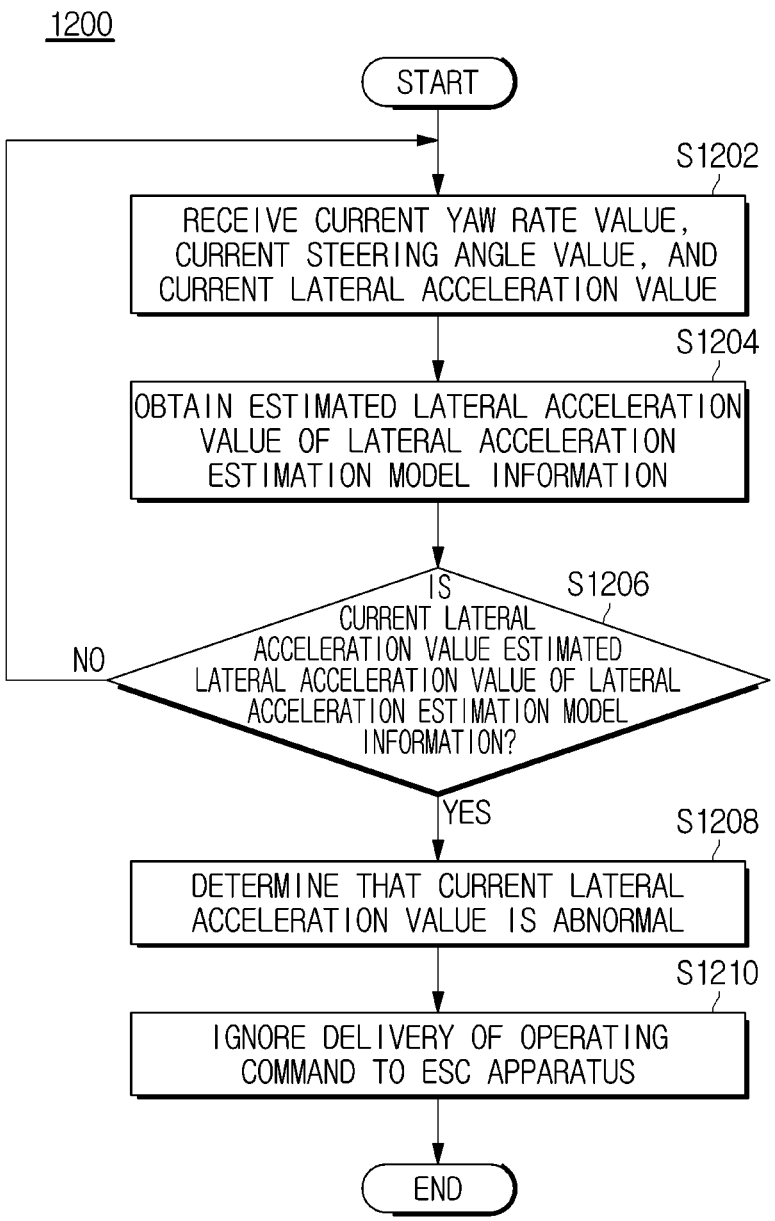
FIG. 12 is a flowchart illustrating still another example of the vehicle control method of the vehicle control apparatus according to an embodiment of the present disclosure.

FIG. 12 is a flowchart illustrating still another example of the vehicle control method of the vehicle control apparatus according to an embodiment of the present disclosure.

Referring to FIGS. 8 to 12, vehicle control methods 800 to 1200 of the vehicle control apparatus 100 (see FIG. 2) according to an embodiment of the present disclosure include input operations S802 to S1202, estimation operations S804 to S1204, and determination operations S806 to S1206 and S808 to S1208.

First, in the input operations S802 to S1202, an input unit 102 receives a current yaw rate value, a current steering angle value, and a current lateral acceleration value that are detected by a detection device 10 (see FIG. 10).

Subsequently, in the estimation operations S804 to S1204, an estimator 103 (see FIG. 2) obtains an estimated lateral acceleration value of lateral acceleration estimation model information Model 1 and Model 2 under the control of a controller 106 (see FIG. 2) on the basis of the current yaw rate value and the current steering angle value received by the input unit 102 (see FIG. 2).

Subsequently, in the determination operations S806 to S1206, a determiner 104 (see FIG. 2) determines whether the current lateral acceleration value received by the input unit 102 (see FIG. 2) is not equal to the lateral acceleration value of lateral acceleration estimation model information Model 1 and Model 2 estimated by the estimator 103 (see FIG. 2) under the control of the controller 106 (see FIG. 2).

In this case, in the determination operations S808 to S1208, the determiner 104 (see FIG. 2) determines that the current lateral acceleration value is abnormal when the determiner 104 (see FIG. 2) determines that the current lateral acceleration value received by the input unit 102 (see FIG. 2) is not equal to the lateral acceleration value of lateral acceleration estimation model information Model 1 and Model 2 estimated by the estimator 103 (see FIG. 2) under the control of the controller 106 (see FIG. 2).

Also, in the input operation S905a of the vehicle control method 900 of the vehicle control apparatus 100 (see FIG. 2) according to an embodiment of the present disclosure, the input unit 102 (see FIG. 2) may further receive first difference values D1-1, D1-2, and D1-3 between current lateral acceleration values corresponding to current vehicle speeds V1, V2, and V3 (see FIG. 4) detected by the detection device 10 (see FIG. 2) over a certain time period and first estimated lateral acceleration values thereof.

In the determination operations S905b and S905c, in order to accurately determine a state of the current lateral acceleration values, the determiner 104 (see FIG. 2) may further determine whether the state is a first state in which the received first difference values D1-1, D1-2, and D1-3 (see FIG. 4) are greater than a predetermined first reference value under the control of the controller 106 (see FIG. 2) (S905b) and may output a first determination signal under the control of the controller 106 (see FIG. 2) when the state is the first state (S905c).

Also, in the input operation S1005a of the vehicle control method 1000 of the vehicle control apparatus 100 (see FIG. 2) according to an embodiment of the present disclosure, the input unit 102 (see FIG. 2) may further receive second difference values D2-1, D2-2, and D2-3 (see FIG. 5) between current lateral acceleration values corresponding to current vehicle speeds V4, V5, and V6 (see FIG. 5) detected by the detection device 10 (see FIG. 2) over a certain time period and second estimated lateral acceleration values thereof.

In the determination operations S1005b and S1005c, in order to accurately determine a state of the current lateral acceleration values, the determiner 104 (see FIG. 2) may further determine whether the state is a second state in which the received second difference values D2-1, D2-2, and D2-3 (see FIG. 5) are greater than a predetermined second reference value under the control of the controller 106 (see FIG. 2) (S1005b) and may output a second determination signal under the control of the controller 106 (see FIG. 2) when the state is the second state (51005c).

Also, in the input operation 51005a of the vehicle control method 1000 of the vehicle control apparatus 100 (see FIG. 2) according to an embodiment of the present disclosure, the input unit 102 (see FIG. 2) may further receive current steering angle values A, B, and C (see FIG. 6) for the current vehicle speeds detected by the detection device 10 (see FIG. 2) over a certain time period.

In the determination operation 51005c, when outputting the second determination signal, the determiner 104 (see FIG. 2) may change determination times DT1, DT2, and DT3 of the second determination signal for levels of the second difference values D2-1, D2-2, and D2-3 according to the current steering angle values A, B, and C (see FIG. 6) corresponding to the received current vehicle speeds.

As an example, in the determination operation S1005c, when it is determined that the current steering angle value A (see FIG. 6) corresponding to the received current vehicle speed is within a steering angle value range corresponding to a predetermined low vehicle speed value range, the determiner 104 (see FIG. 2) may output the second determination signal at a first determination time DT1' (see FIG. 6) among the determination times DT1, DT2, and DT3 (see FIG. 6) of the second determination signal corresponding to the levels of the second difference values D2-1, D2-2, and D2-3 (see FIG. 6).

Also, in the determination operation S1005c, when it is determined that the current steering angle value B (see FIG. 6) corresponding to the received current vehicle speed is within a steering angle value range corresponding to a predetermined medium vehicle speed value range, the determiner 104 (see FIG. 2) may output the second determination signal at a second determination time DT2' (see FIG. 6) that is set longer than the first determination time DT1' (see FIG. 6) among the determination times DT1, DT2, and DT3 (see FIG. 6) of the second determination signal corresponding to the levels of the second difference values D2-1, D2-2, and D2-3 (see FIG. 6).

Also, in the determination operation S1005c, when it is determined that the current steering angle value C (see FIG. 6) corresponding to the received current vehicle speed is within a steering angle value range corresponding to a predetermined high vehicle speed value range, the determiner 104 (see FIG. 2) may output the second determination signal at a third determination time DT3' (see FIG. 6) that is set longer than the second determination time DT2' (see FIG. 6) among the determination times DT1, DT2, and DT3 (see FIG. 6) of the second determination signal corresponding to the levels of the second difference values D2-1, D2-2, and D2-3 (see FIG. 6).

In the determination operation S1005c, when it is determined that the current steering angle value corresponding to the current vehicle speed is not received by the input unit 102 (see FIG. 2), the determiner 104 (see FIG. 2) may output the second determination signal at a certain determination time DTR (see FIG. 6) of the second determination signal that is set shorter than the first determination time DT1'.

Also, in the input operation S1105a of the vehicle control method 1100 of the vehicle control apparatus 100 (see FIG. 2) according to an embodiment of the present disclosure, the input unit 102 (see FIG. 2) may further receive third difference values D3-1, D3-2, and D3-3 (see FIG. 7) between first estimated lateral acceleration values and second estimated lateral acceleration values corresponding to current vehicle speeds V7, V8, and V9 (see FIG. 7) detected by the detection device 10 (see FIG. 2) over a certain time period.

In the determination operations S1105b and S1105c, in order to accurately determine a state of the current lateral acceleration values by increasing reliability of the first estimated lateral acceleration values and the second estimated lateral acceleration values, the determiner 104 (see FIG. 2) may further determine whether the state is a third state in which the received third difference values D3-1, D3-2, and D3-3 (see FIG. 7) are smaller than a predetermined third reference value under the control of the controller 106 (see FIG. 2) (S1105b) and may output a third determination signal under the control of the controller 106 (see FIG. 2) when the state is the third state (S1105c).

Also, the vehicle control method 1200 of the vehicle control apparatus 100 (see FIG. 2) according to an embodiment of the present disclosure may further include an operating command prohibition operation (S1210).

As an example, the operating command prohibition operation S1210 may be performed after the determination operation S1208.

That is, in the operating command prohibition operation S1210, when it is determined by the determiner 104 (see FIG. 2) that the current lateral acceleration value is abnormal, the controller 106 (see FIG. 2) may not deliver an operating command to the ESC apparatus 30 (see FIG. 2).

Figure 13:
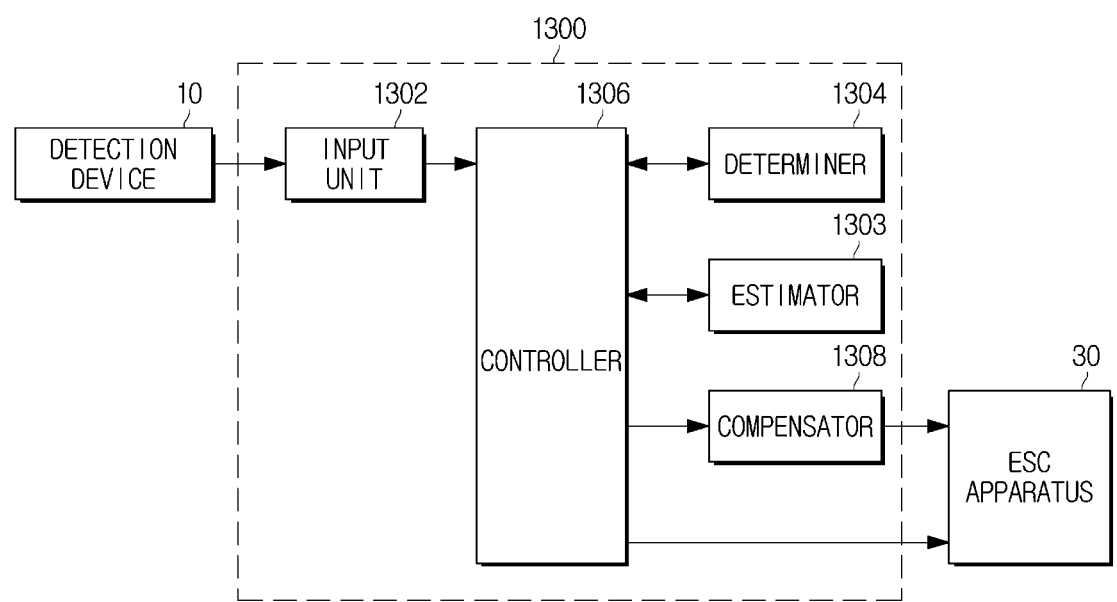
FIG. 13 is a block diagram showing another example of the vehicle control apparatus according to an embodiment of the present disclosure.

FIG. 13 is a block diagram showing another example of the vehicle control apparatus according to an embodiment of the present disclosure.

Referring to FIG. 13, a vehicle control apparatus 1300 according to an embodiment of the present disclosure includes, like the vehicle control apparatus 100 (see FIG. 2), an input unit 1302, an estimator 1303, a determiner 1304, and a controller 1306.

Functions of and systematic connections between elements of the vehicle control apparatus 1300 according to an embodiment of the present disclosure are the same as those of the vehicle control apparatus 100 (see FIG. 2), and thus additional descriptions thereof will be omitted.

Here, the vehicle control apparatus 1300 according to an embodiment of the present disclosure may further include a compensator 1308.

That is, when it is determined by the determiner 1304 that the current lateral acceleration value is abnormal, the compensator 1308 compensates for the current lateral acceleration value under the control of the controller 1306 so that the ESC apparatus 30 can be operated according to a predetermined target lateral acceleration value range.

For the vehicle control apparatus 1300 according to an embodiment of the present disclosure, the input unit 1302, the estimator 1303, the determiner 1304, the controller 1306, and the compensator 1308 have been described as separate elements in order to clearly illustrate the features of the present disclosure. However, although not shown, the input unit 1302, the estimator 1303, the determiner 1304, the controller 1306, and the compensator 1308 may be a typical ECU or MCU for controlling the entire operation, performing input and determination functions, estimating a lateral acceleration value, and compensating for a lateral acceleration value.

Also, the input unit 1302, the estimator 1303, the determiner 1304, the controller 1306, and the compensator 1308 are not limited thereto. Any control means for controlling the entire vehicular operation, any input means for performing an input function, any determination means for performing a determination function, any estimation means for estimating a lateral acceleration value, and any compensation means for compensating for a lateral acceleration value may be used, respectively, as the controller 1306, the input unit 1302, the determiner 1304, the estimator 1303, and the compensator 1308.

Here, the input unit 1302, the estimator 1303, the determiner 1304, and the controller 1306 may be provided in the ECU (not shown) or the MCU (not shown) integrally or separately.

A vehicle control method for controlling a vehicle by means of the vehicle control apparatus 1300 according to an embodiment of the present disclosure will be described with reference to FIG. 14.

Figure 14:
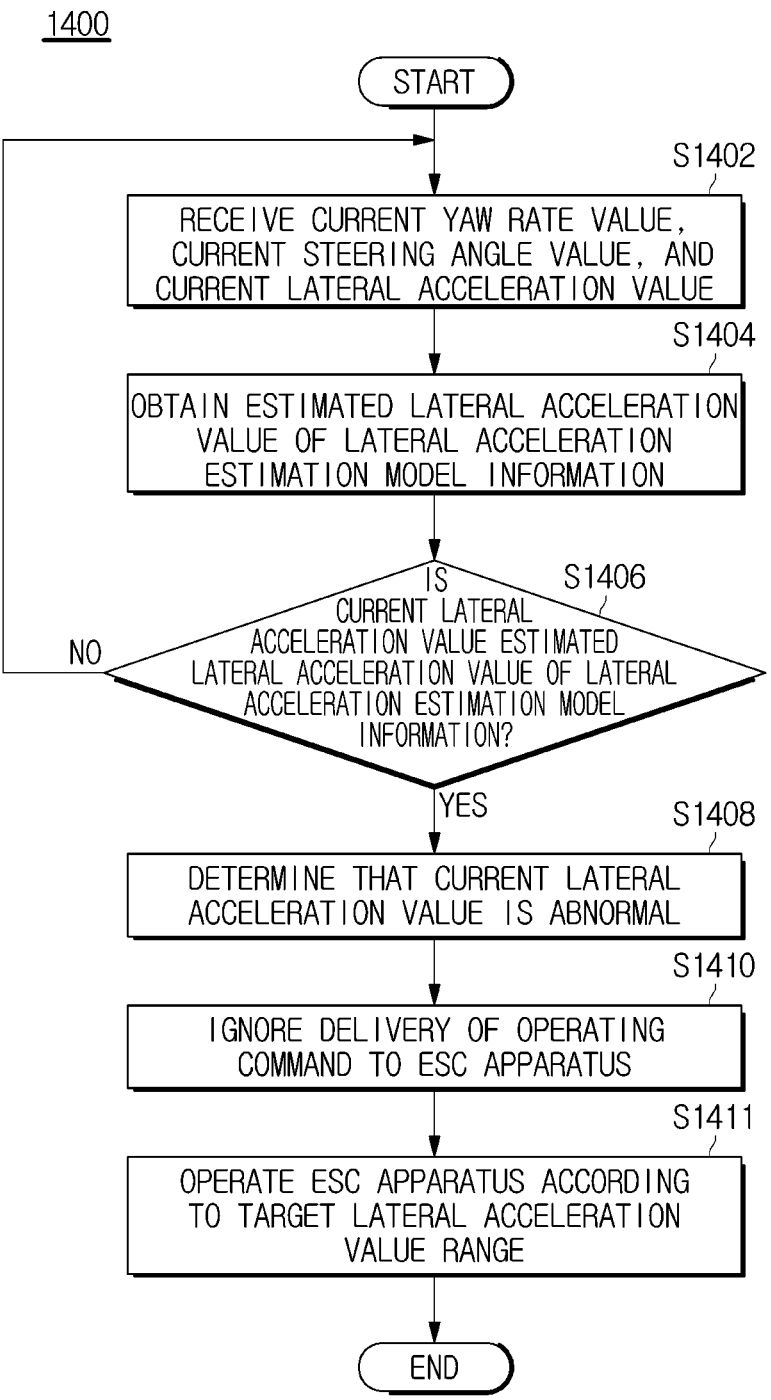
FIG. 14 is a flowchart illustrating still another example of the vehicle control method of the vehicle control apparatus according to an embodiment of the present disclosure.

FIG. 14 is a flowchart illustrating still another example of the vehicle control method of the vehicle control apparatus according to an embodiment of the present disclosure.

Referring to FIG. 14, a vehicle control method 1400 of the vehicle control apparatus 1300 (see FIG. 13) according to an embodiment of the present disclosure includes, like the vehicle control method 1200 (see FIG. 12) of the vehicle control apparatus 100 (see FIG. 2), an input operation S1402, an estimation operation S1404, determination operations S1406 and S1408, and an operating command prohibition operation S1410.

Functions of and systematic connections between operations of the vehicle control method 1400 of the vehicle control apparatus 1300 (see FIG. 13) according to an embodiment of the present disclosure are the same as those of the vehicle control method 1200 (see FIG. 12) of the vehicle control apparatus 100 (see FIG. 2), and thus additional descriptions thereof will be omitted.

Here, the vehicle control method 1400 of the vehicle control apparatus 1300 (see FIG. 13) according to an embodiment of the present disclosure may further include a compensation operation S1411.

As an example, the compensation operation S1411 may be performed after the operating command prohibition operation S1410.

That is, in the compensation operation S1411, when it is determined by the determiner 1304 (see FIG. 13) that the current lateral acceleration value is abnormal, the compensator 1308 (see FIG. 13) may compensate for the current lateral acceleration value under the control of the controller 1306 (see FIG. 13) so that the ESC apparatus 30 (see FIG. 13) can be operated according to a predetermined target lateral acceleration value range.

Figure 15:
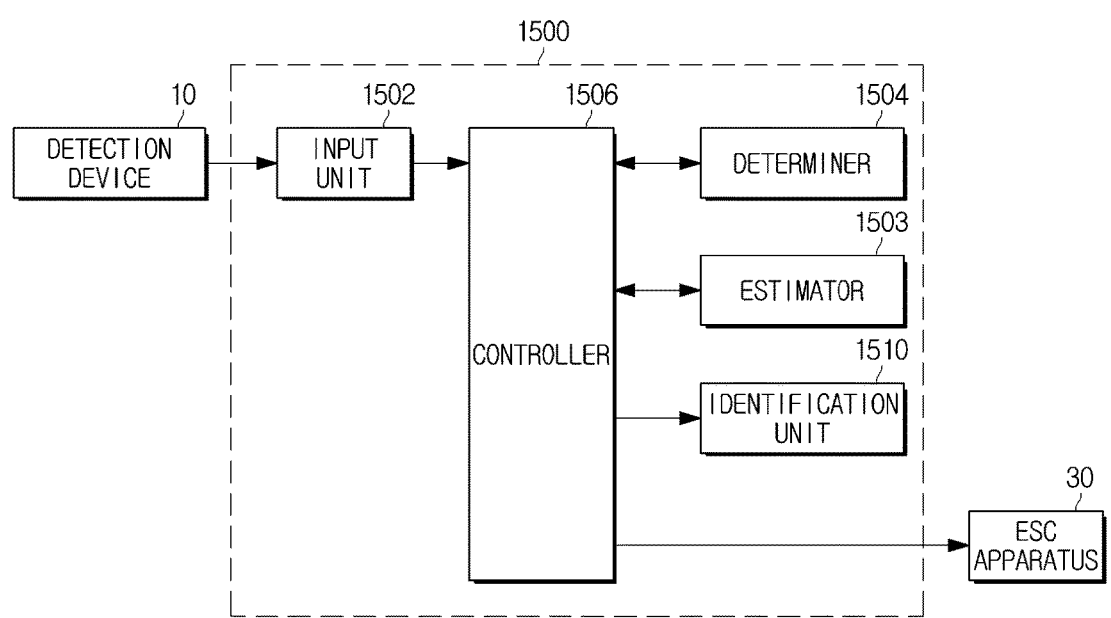
FIG. 15 is a block diagram showing still another example of the vehicle control apparatus according to an embodiment of the present disclosure.

FIG. 15 is a block diagram showing still another example of the vehicle control apparatus according to an embodiment of the present disclosure.

Referring to FIG. 15, a vehicle control apparatus 1500 according to an embodiment of the present disclosure includes, like the vehicle control apparatus 100 (see FIG. 2), an input unit 1502, an estimator 1503, a determiner 1504, and a controller 1506.

Functions of and systematic connections between elements of the vehicle control apparatus 1500 according to an embodiment of the present disclosure are the same as those of the vehicle control apparatus 100 (see FIG. 2), and thus additional descriptions thereof will be omitted.

Here, the vehicle control apparatus 1300 according to an embodiment of the present disclosure may further include an identification unit 1510.

That is, when the determiner 1504 determines that the current lateral acceleration value is not equal to the estimated lateral acceleration value of the lateral acceleration estimation model information Model 1 and Model 2, the identification unit 1510 may identify that the current lateral acceleration value is abnormal under the control of the controller 1506.

In this case, although not shown, the identification unit 1510 may include at least one of an alarm device (not shown), a speaker (not shown), and a light emitting member (not shown) that are provided so that a driver can identify vehicular information or status and may identify that the current lateral acceleration value is abnormal through at least one of an alarm operation of the alarm device (not shown), a voice operation of the speaker (not shown), and a light emitting operation of the light emitting member (not shown).

Also, although not shown, the identification unit 1510 may include at least one of a human machine interface (HMI) module (not shown) and a head-up display (HUD) module (not shown) installed to form an interface between a user and a machine to enable a driver to recognize vehicular information or status and may identify that the current lateral acceleration value is abnormal through at least one of an HMI message display operation of the HMI module (not shown) and a HUD message display operation of the HUD module (not shown).

A vehicle control method of the vehicle control apparatus 1500 according to an embodiment of the present disclosure will be described with reference to FIG. 16.

Figure 16:
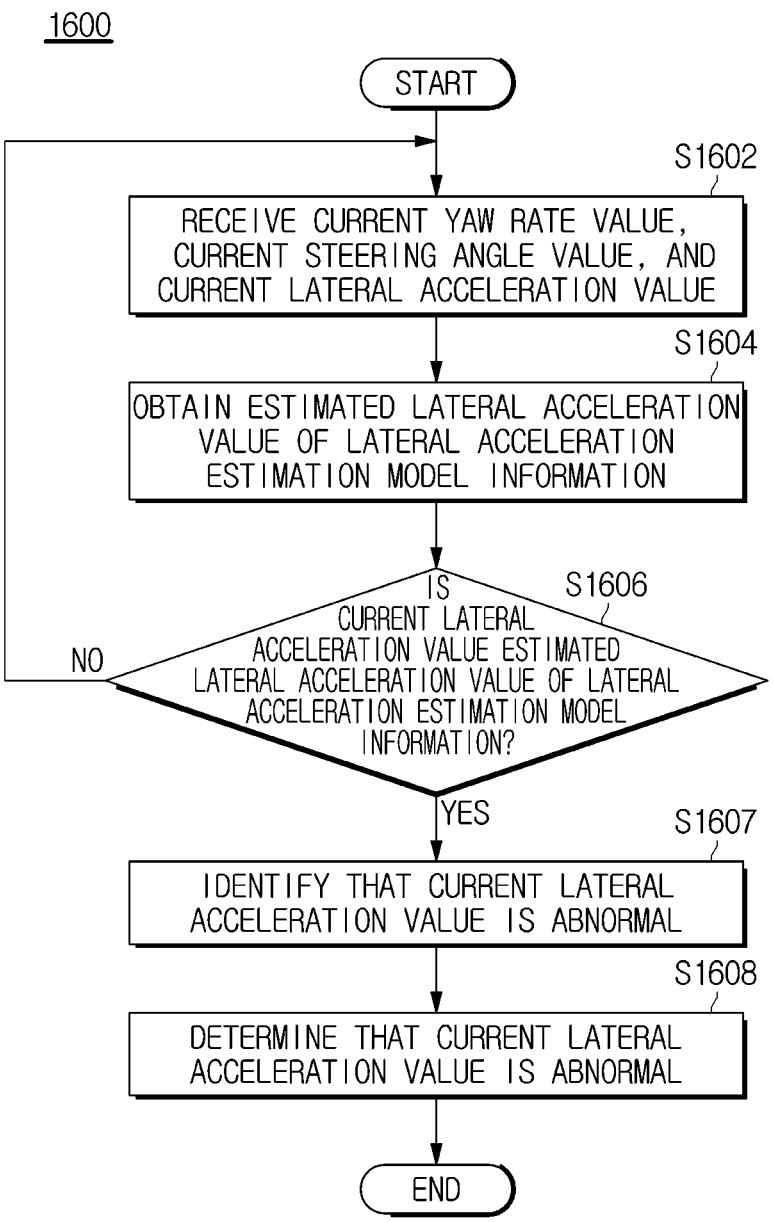
FIG. 16 is a flowchart illustrating still another example of the vehicle control method of the vehicle control apparatus according to an embodiment of the present disclosure.

FIG. 16 is a flowchart illustrating still another example of the vehicle control method of the vehicle control apparatus according to an embodiment of the present disclosure.

Referring to FIG. 16, a vehicle control method 1600 of the vehicle control apparatus 1500 (see FIG. 15) according to an embodiment of the present disclosure includes, like the vehicle control method 800 (see FIG. 8) of the vehicle control apparatus 100 (see FIG. 2), an input operation S1602, an estimation operation S1604, and determination operations S1606 and S1608.

Functions of and systematic connections between operations of the vehicle control method 1600 of the vehicle control apparatus 1500 (see FIG. 15) according to an embodiment of the present disclosure are the same as those of the vehicle control method 800 (see FIG. 8) of the vehicle control apparatus 100 (see FIG. 2), and thus additional descriptions thereof will be omitted.

Here, the vehicle control method 1600 of the vehicle control apparatus 1500 (see FIG. 15) according to an embodiment of the present disclosure may further include a first identification operation (S1607).

As an example, the first identification operation S1607 may be performed between the determination operations S1606 and S1608.

As another example, although not shown, the first identification operation (not shown) may be performed in synchronization with the determination operation S1608.

That is, in the first identification operation S1607, when the determiner 1504 (see FIG. 15) determines that the current lateral acceleration value is not equal to the estimated lateral acceleration value of the lateral acceleration estimation model information Model 1 and Model 2, the identification unit 1510 (see FIG. 15) may identify that the current lateral acceleration value is abnormal under the control of the controller 1506 (see FIG. 15).

Figure 17:
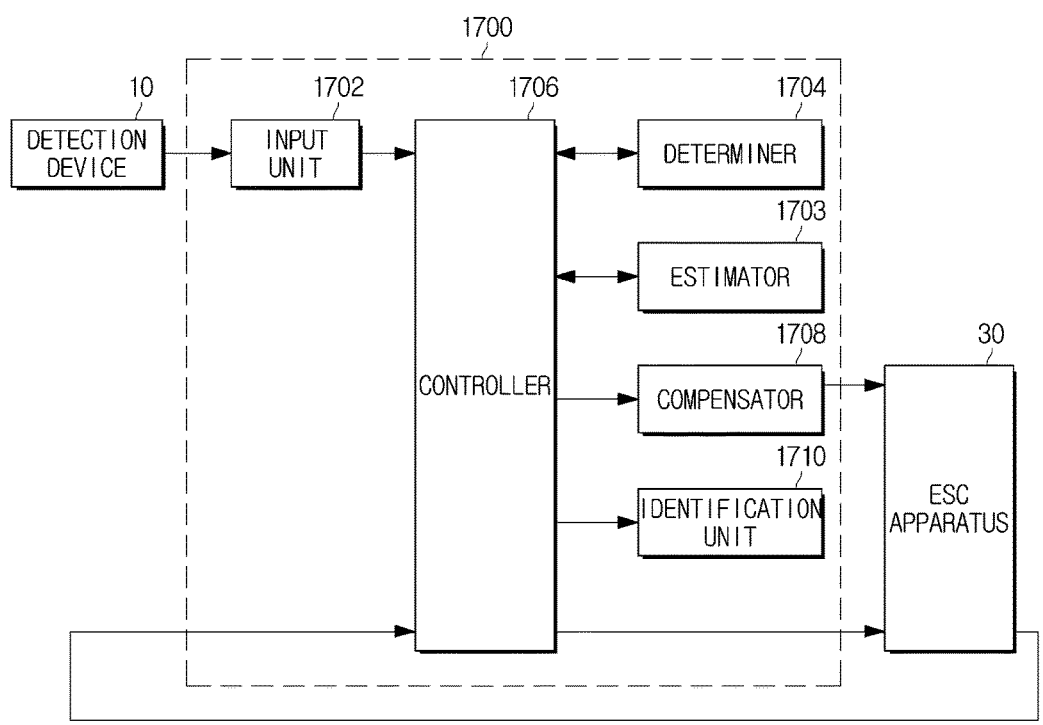
FIG. 17 is a block diagram showing still another example of the vehicle control apparatus according to an embodiment of the present disclosure.

FIG. 17 is a block diagram showing still another example of the vehicle control apparatus according to an embodiment of the present disclosure.

Referring to FIG. 17, a vehicle control apparatus 1700 according to an embodiment of the present disclosure includes, like the vehicle control apparatus 1300 (see FIG.

13), an input unit 1702, an estimator 1703, a determiner 1704, a controller 1706, and a compensator 1708.

Functions of and systematic connections between elements of the vehicle control apparatus 1700 according to an embodiment of the present disclosure are the same as those of the vehicle control apparatus 1300 (see FIG. 13), and thus additional descriptions thereof will be omitted.

Here, the vehicle control apparatus 1700 according to an embodiment of the present disclosure may further include an identification unit 1710.

That is, when the compensator 1708 operates the ESC apparatus 30 according to a target lateral acceleration value range, the identification unit 1710 may identify that compensation for the current lateral acceleration value is being made under the control of the controller 1706.

Also, when a lateral acceleration compensation completion signal output from the ESC apparatus 30 is supplied from the controller 1706, the identification unit 1710 may identify that the compensation for the current lateral acceleration value has been completed under the control of the controller 1706.

In this case, although not shown, the identification unit 1710 may include at least one of an alarm device (not shown), a speaker (not shown), and a light emitting member (not shown) that are provided so that a driver can identify vehicular information or status and may identify that the compensation for the current lateral acceleration value is being made and identify that the compensation for the current lateral acceleration value has been completed through at least one of an alarm operation of the alarm device (not shown), a voice operation of the speaker (not shown), and a light emitting operation of the light emitting member (not shown).

Also, although not shown, the identification unit 1710 may include at least one of an HMI module (not shown) and an HUD module (not shown) installed to form an interface between a user and a machine to enable a driver to recognize vehicular information or status and may identify that the compensation for the current lateral acceleration value is being made and identify that the compensation for the current lateral acceleration value has been completed through at least one of an HMI message display operation of the HMI module (not shown) and a HUD message display operation of the HUD module (not shown).

A vehicle control method of the vehicle control apparatus 1700 according to an embodiment of the present disclosure will be described with reference to FIGS. 18 and 19.

Figure 18:
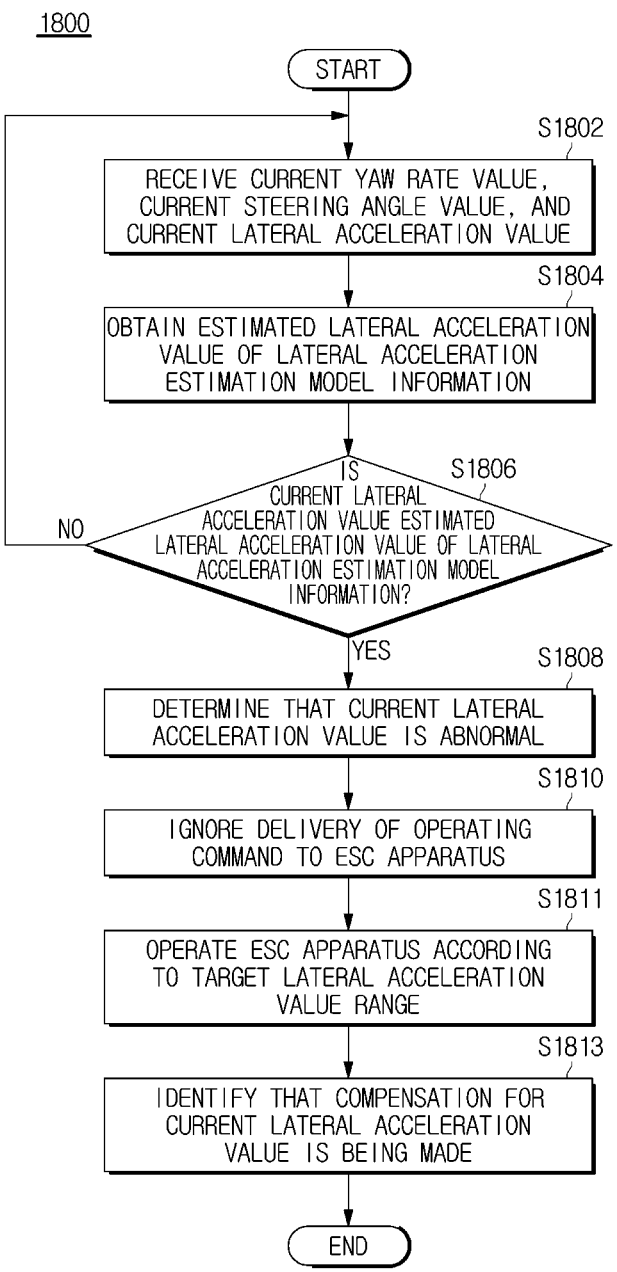
FIG. 18 is a flowchart illustrating still another example of the vehicle control method of the vehicle control apparatus according to an embodiment of the present disclosure.
Figure 19:
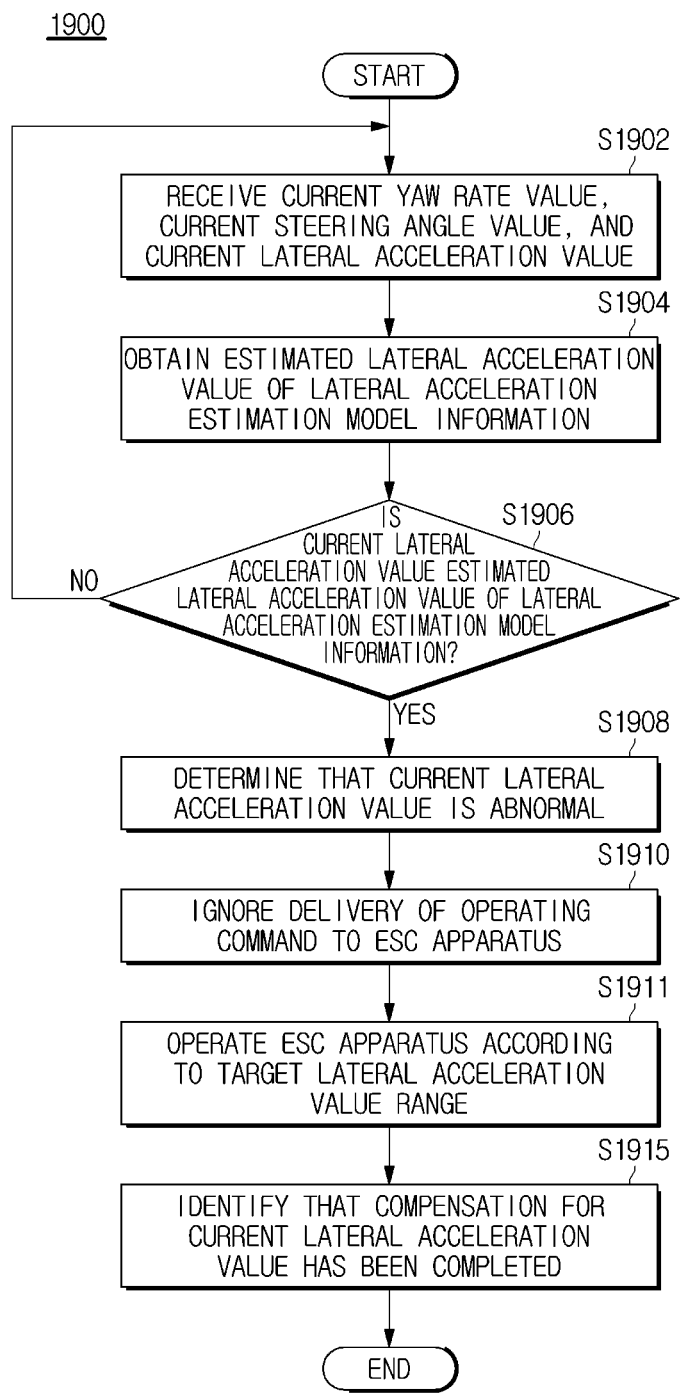
FIG. 19 is a flowchart illustrating still another example of the vehicle control method of the vehicle control apparatus according to an embodiment of the present disclosure.

FIG. 18 is a flowchart illustrating still another example of the vehicle control method of the vehicle control apparatus according to an embodiment of the present disclosure, and FIG. 19 is a flowchart illustrating still another example of the vehicle control method of the vehicle control apparatus according to an embodiment of the present disclosure.

Referring to FIGS. 18 and 19, vehicle control methods 1800 and 1900 of the vehicle control apparatus 1700 (see FIG. 17) according to an embodiment of the present disclosure include, like the vehicle control method 1400 (see FIG. 14) of the vehicle control apparatus 1300 (see FIG. 13), input operations S1802 and S1902, estimation operations S1804 and S1904, determination operations S1806, S1906, S1808, and S1908, operating command prohibition operations S1810 and 1910, and compensation operations S1811 and S1911.

Functions of and systematic connections between operations of the vehicle control methods 1800 and 1900 of the vehicle control apparatus 1700 (see FIG. 17) according to an embodiment of the present disclosure are the same as those of the vehicle control method 1400 (see FIG. 14) of the vehicle control apparatus 1300 (see FIG. 13), and thus additional descriptions thereof will be omitted.

Here, the vehicle control methods 1800 and 1900 of the vehicle control apparatus 1700 (see FIG. 17) according to an embodiment of the present disclosure may further include a second identification operation (S1813) and a third identification operation S1915.

As an example, the second identification operation S1813 may be performed after the compensation operation S1811.

As another example, although not shown, the second identification operation (not shown) may be performed in synchronization with the compensation operation S1811.

That is, in the second identification operation S1813, when the compensator 1708 (see FIG. 17) operates the ESC apparatus 30 (see FIG. 17) according to a target lateral acceleration value range, the identification unit 1710 (see FIG. 17) may identify that the compensation for the current lateral acceleration value is being made under the control of the controller 1706 (see FIG. 17).

Also, the third identification operation S1915 may be performed after the compensation operation S1911.

That is, in the third identification operation S1915, when a lateral acceleration compensation completion signal output from the ESC apparatus 30 (see FIG. 17) is supplied from the controller 1706 (see FIG. 17), the identification unit 1710 (see FIG. 17) may identify that the compensation for the current lateral acceleration value has been completed under the control of the controller 1706 (see FIG. 17).

As described above, the vehicle control apparatus 100 and the control methods thereof 800 to 1200 according to an embodiment of the present disclosure includes the input units 102, 1302, 1502, and 1702, the estimators 103, 1303, 1503, and 1703, the determiners 104, 1304, 1504, and 1704, and controllers 106, 1306, 1506, and 1706 and may perform the input operations S802 to S1202, S1402, S1602, S1802, and S1902, the estimation operations S804 to S1204, S1404, S1604, S1804, and S1904, and the determination operations S806 to S1206, S808 to S1208, S1406, S1408, S1606, S1608, S1806, S1808, S1906, and S1908.

Accordingly, the vehicle control apparatus 100 and the control methods thereof 800 to 1200 according to an embodiment of the present disclosure can prevent malfunction of the ESC apparatus 30 when the current lateral acceleration value is abnormal, thereby enhancing vehicular stability.

Also, the vehicle control apparatus 100 and the control methods thereof 800 to 1200 according to an embodiment of the present disclosure may include an input unit 102 and may further perform the input operations S905a to S1105a and determination operations S905b to S1105b and S905c to S1105c.

Accordingly, the vehicle control apparatus 100 and the control methods thereof 900 to 1100 according to an embodiment of the present disclosure can accurately determine the state of the current lateral acceleration value and thus can further prevent malfunction of the ESC apparatus 30, thereby further enhancing vehicular stability.

Also, the vehicle control apparatuses 100 and 1300 and the control methods thereof 1200 and 1400 according to an embodiment of the present disclosure may include the controller 106 and 1306 and may further perform the operating command prohibition operations S1210 and S1410.

Accordingly, the vehicle control apparatuses 100 and 1300 and the control methods thereof 1200 and 1400 according to an embodiment of the present disclosure can suspend the operation of the ESC apparatus 30 when the current lateral acceleration value is abnormal and thus can further prevent malfunction of the ESC apparatus 30, thereby further enhancing vehicular stability.

Also, the vehicle control apparatuses 1300 and 1700 and the control methods thereof 1400, 1800, and 1900 according to an embodiment of the present disclosure may include the compensator 1308 and 1708 and may further perform the compensation operations S1411, S1811, and S1911.

Accordingly, the vehicle control apparatuses 1300 and 1700 and the control methods thereof 1400, 1800, and 1900 according to an embodiment of the present disclosure may compensate for the current lateral acceleration value so that the ESC apparatus 30 can be operated according to a target lateral acceleration value range when the current lateral acceleration value is abnormal, thereby further enhancing efficiency in controlling a vehicular orientation.

Also, the vehicle control apparatuses 1500 and 1700 and the control methods thereof 1600, 1800, and 1900 according to an embodiment of the present disclosure may include the identification units 1510 and 1710 and may further perform the first identification operation S1607, the second identification operation S1813, and the third identification operation S1915.

Accordingly, the vehicle control apparatuses 1500 and 1700 and the control methods thereof 1600, 1800, and 1900 according to an embodiment of the present disclosure may enable a driver to recognize that the current lateral acceleration value is abnormal, recognize that compensation for the current lateral acceleration value is being made, and recognize that compensation for the current lateral acceleration value has been completed, and thus can reduce anxiety about the current operating state while providing guidance for careful driving to a driver.

As is apparent from the above description, the vehicle control apparatus and the control method thereof according to an embodiment of the present disclosure can prevent malfunction of an ESC apparatus and enhance vehicular stability.

The vehicle control apparatus and the control method thereof according to an embodiment of the present disclosure can further enhance efficiency in controlling a vehicular orientation.

The vehicle control apparatus and the control method thereof according to an embodiment of the present disclosure can reduce anxiety about the current operating state while providing guidance for careful driving to a driver.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A vehicle control apparatus comprising:
   an input unit configured to receive a current yaw rate value, a current steering angle value, and a current lateral acceleration value detected by a detection device;
   an estimator configured to obtain an estimated lateral acceleration value of lateral acceleration estimation model information on the basis of the received current yaw rate value and current steering angle value;
   a determiner configured to determine that the current lateral acceleration value is abnormal when the received current lateral acceleration value is not equal to the estimated lateral acceleration value of the lateral acceleration estimation model information; and
   a controller configured to receive the current yaw rate value, the current steering angle value, and the current lateral acceleration value, deliver an estimation command to the estimator, and deliver a determination command to the determiner.

2. The vehicle control apparatus of claim 1, wherein the lateral acceleration estimation model information includes first lateral acceleration estimation model information for calculating a first estimated lateral acceleration value by using the current yaw rate value and a current vehicle speed value.

3. The vehicle control apparatus of claim 1, wherein the lateral acceleration estimation model information includes second lateral acceleration estimation model information for calculating a second estimated lateral acceleration value by using the current steering angle value, a current vehicle speed value, a distance value between a front wheel and a rear wheel, and a vehicular characteristic speed value.

4. The vehicle control apparatus of claim 1,
   wherein the input unit further receives first difference values between current lateral acceleration values corresponding to current vehicle speeds further detected by the detection device over a certain time period and first estimated lateral acceleration values, and
   wherein the determiner further determines whether the current lateral acceleration values are in a first state in which the received first difference values are greater than a predetermined first reference value and outputs a first determination signal when the current lateral acceleration values are in the first state.

5. The vehicle control apparatus of claim 1,
   wherein the input unit further receives second difference values between current lateral acceleration values corresponding to current vehicle speeds further detected by the detection device over a certain time period and second estimated lateral acceleration values, and
   wherein the determiner further determines whether the current lateral acceleration values are in a second state in which the received second difference values are greater than a predetermined second reference value and outputs a second determination signal when the current lateral acceleration values are in the second state.

6. The vehicle control apparatus of claim 5,
   wherein the input unit further receives current steering angle values corresponding to current vehicle speeds further detected by the detection device over a certain time period, and
   wherein the determiner changes determination times of the second determination signal corresponding to levels of the second difference values according to the current steering angle values corresponding to the current vehicle speeds while outputting the second determination signal.

7. The vehicle control apparatus of claim 6, wherein the determiner outputs the second determination signal at a first determination time among the determination times of the second determination signal corresponding to the levels of the second difference values when the received current steering angle values corresponding to the current vehicle speeds are within a steering angle value range corresponding to a predetermined low vehicle speed value range, outputs the second determination signal at a second determination time set longer than the first determination time among the determination times of the second determination signal corresponding to the levels of the second difference values when the received current steering angle values corresponding to the current vehicle speeds are within a steering angle value range corresponding to a predetermined medium vehicle speed value range, and outputs the second determination signal at a third determination time set longer than the second determination time among the determination times of the second determination signal corresponding to the levels of the second difference values when the received current steering angle values corresponding to the current vehicle speeds are within a steering angle value range corresponding to a predetermined high vehicle speed value range.

8. The vehicle control apparatus of claim 1,
wherein the input unit further receives third difference values between first estimated lateral acceleration values and second estimated lateral acceleration values corresponding to current vehicle speeds further detected by the detection device over a certain time period, and
wherein the determiner further determines whether the current lateral acceleration values are in a third state in which the received third difference values are smaller than a predetermined third reference value and outputs a third determination signal when the current lateral acceleration values are in the third state.

9. The vehicle control apparatus of claim 1, wherein the controller ignores delivery of an operating command to an electronic stability control (ESC) apparatus when the current lateral acceleration value is abnormal.

10. The vehicle control apparatus of claim 1, further comprising a compensator configured to compensate for the current lateral acceleration value so that the ESC apparatus is operated according to a predetermined target lateral acceleration value range when the current lateral acceleration value is abnormal.

11. A vehicle control method comprising:
receiving a current yaw rate value, a current steering angle value, and a current lateral acceleration value detected by a detection device;
obtaining an estimated lateral acceleration value of lateral acceleration estimation model information on the basis of the received current yaw rate value and current steering angle value; and
determining that the current lateral acceleration value is abnormal when the received current lateral acceleration value is not equal to the estimated lateral acceleration value of the lateral acceleration estimation model information.

12. The vehicle control method of claim 11, further comprising:
receiving first difference values between current lateral acceleration values corresponding to current vehicle speeds further detected by the detection device over a certain time period and first estimated lateral acceleration values; and
determining whether the current lateral acceleration values are in a first state in which the received first difference values are greater than a predetermined first reference value and outputting a first determination signal when the current lateral acceleration values are in the first state.

13. The vehicle control method of claim 11, further comprising:
receiving second difference values between current lateral acceleration values corresponding to current vehicle speeds further detected by the detection device over a certain time period and second estimated lateral acceleration values; and
determining whether the current lateral acceleration values are in a second state in which the received second difference values are greater than a predetermined second reference value and outputting a second determination signal when the current lateral acceleration values are in the second state.

14. The vehicle control method of claim 13, further comprising:
receiving current steering angle values corresponding to current vehicle speeds further detected by the detection device over a certain time period; and
changing determination times of the second determination signal corresponding to levels of the second difference values according to the current steering angle values corresponding to the current vehicle speeds while outputting the second determination signal.

15. The vehicle control method of claim 14, further comprising:
outputting the second determination signal at a first determination time among the determination times of the second determination signal corresponding to the levels of the second difference values when the received current steering angle values corresponding to the current vehicle speeds are within a steering angle value range corresponding to a predetermined low vehicle speed value range;
outputting the second determination signal at a second determination time set longer than the first determination time among the determination times of the second determination signal corresponding to the levels of the second difference values when the received current steering angle values corresponding to the current vehicle speeds are within a steering angle value range corresponding to a predetermined medium vehicle speed value range; and
outputting the second determination signal at a third determination time set longer than the second determination time among the determination times of the second determination signal corresponding to the levels of the second difference values when the received current steering angle values corresponding to the current vehicle speeds are within a steering angle value range corresponding to a predetermined high vehicle speed value range.

16. The vehicle control method of claim 11, further comprising:
receiving third difference values between first estimated lateral acceleration values and second estimated lateral acceleration values corresponding to current vehicle speeds further detected by the detection device over a certain time period; and
determining whether the current lateral acceleration values are in a third state in which the received third difference values are smaller than a predetermined third reference value and outputting a third determination signal when the current lateral acceleration values are in the third state.

17. The vehicle control method of claim 11, further comprising ignoring delivery of an operating command to an electronic stability control (ESC) apparatus when the current lateral acceleration value is abnormal.

18. The vehicle control method of claim 11, further comprising compensating for the current lateral acceleration value so that the ESC apparatus is operated according to a predetermined target lateral acceleration value range when the current lateral acceleration value is abnormal.

* * * * *